US011700677B2

(12) United States Patent
Yao et al.

(10) Patent No.: US 11,700,677 B2
(45) Date of Patent: Jul. 11, 2023

(54) DRIVING CIRCUIT FOR LED LAMP, LED LAMP CONTAINING SAME AND METHOD FOR OPERATING DRIVING CIRCUIT

(71) Applicant: SAVANT TECHNOLOGIES LLC, East Cleveland, OH (US)

(72) Inventors: Pan Yao, Shanghai (CN); Wei Rong, Shanghai (CN); Jie Gao, Shanghai (CN); Bin Li, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 21 days.

(21) Appl. No.: 17/542,332

(22) Filed: Dec. 3, 2021

(65) Prior Publication Data
US 2022/0183121 A1    Jun. 9, 2022

(30) Foreign Application Priority Data

Dec. 4, 2020   (CN) .......................... 202022881472.6

(51) Int. Cl.
*H05B 45/14*     (2020.01)
*H05B 45/345*    (2020.01)
*H05B 45/3725*   (2020.01)

(52) U.S. Cl.
CPC ........... *H05B 45/14* (2020.01); *H05B 45/345* (2020.01); *H05B 45/3725* (2020.01)

(58) Field of Classification Search
CPC .................... H05B 45/14; H05B 45/24; H05B 45/30–335; H05B 45/345; H05B 45/3725
See application file for complete search history.

(56) References Cited

U.S. PATENT DOCUMENTS

2012/0303212 A1* 11/2012 Miller ...................... G08B 7/06
701/36

FOREIGN PATENT DOCUMENTS

CN        109712468 A   *  5/2019
WO    WO-2015021706 A1  *  2/2015  ......... H05B 33/0815
(Continued)

*Primary Examiner* — Abdullah A Riyami
*Assistant Examiner* — Syed M Kaiser
(74) *Attorney, Agent, or Firm* — Wood IP LLC

(57) ABSTRACT

Disclosed is a driving circuit for a Light Emitting Diode (LED) lamp, the LED lamp containing the driving circuit and a method for operating the driving circuit. The driving circuit includes: three alternating voltage input terminals, including two alternating voltage input terminals for receiving an alternating voltage and one common terminal, the two alternating voltage input terminals are controlled so that at least one alternating voltage input terminal receives the alternating voltage from a power supply; a constant current control circuit receiving the alternating voltage through at least one alternating voltage input terminal and outputting a constant direct current to an LED load, the constant current control circuit includes a constant current control chip having a maximum on-time pin; and a three-stage dimming detection control circuit including a variable control resistor for three-stage dimming control, and is controlled by the alternating voltage received by at least one alternating voltage input terminal so that the variable control resistor is connected to the maximum on-time pin with different resistance values, and the constant current control chip outputs three different current levels according to a resistance value of the connected variable control resistor.

20 Claims, 12 Drawing Sheets

(56) References Cited

FOREIGN PATENT DOCUMENTS

| WO | WO-2015106484 A1 | * | 7/2015 | ......... H05B 33/0851 |
| WO | WO-2020077953 A1 | * | 4/2020 | ............ H05B 45/00 |

* cited by examiner

DRIVING CIRCUIT FOR LED LAMP, LED LAMP CONTAINING SAME AND METHOD FOR OPERATING DRIVING CIRCUIT

TECHNICAL FIELD

The present application relates to Light Emitting Diode (LED) illumination technology, and particularly relates to a driving circuit for an LED lamp and the LED lamp containing the same, and the driving circuit is configured to perform three-stage dimming control on an LED load of the LED lamp.

BACKGROUND

A three-stage dimming driving circuit of a related LED lamp adopts three-wire inputs in which two wires are live wires, and one wire is a zero wire, there is a three-stage selection switching circuit between the three-wire inputs and the three-stage dimming driving circuit. With the three-stage selection switching circuit, two-wire connection of one live wire and one zero wire may be selected, or connection of two live wires and one zero wire is selected. The related three-stage dimming control circuit is capable of adjusting a current level output from the driving circuit to an LED load by connecting two live wires to switching action pins DET1 and DET2 of a constant current control chip in the driving circuit respectively, thereby achieving three-stage dimming. This scheme requires a special constant current control chip which needs to have the switching action pins DET1 and DET2 and to withstand a high voltage, so that the constant current control chip has a high cost, a small circuit design space and low flexibility.

SUMMARY

A main object of the present disclosure is to provide a driving circuit capable of performing three-stage dimming control on an LED lamp and the LED lamp containing the driving circuit, in order to solve problems in the prior art that a constant current control chip is high in cost and poor in platform compatibility, thereby achieving the driving circuit with the low cost and good platform compatibility without switching action pins DET1 and DET2 of the constant current control chip, so that a circuit design space is larger.

In order to achieve the above object, according to one aspect of the present disclosure, a driving circuit for an LED lamp is provided, the driving circuit is configured to perform three-stage dimming control on the LED lamp, the three-stage dimming control is used for controlling the driving circuit to respectively provide three different levels of currents to an LED load of the LED lamp, wherein the driving circuit includes: three alternating voltage input terminals including two alternating voltage input terminals for receiving an alternating voltage and one common terminal, the two alternating voltage input terminals are controlled so that at least one alternating voltage input terminal receives the alternating voltage from a power supply; a constant current control circuit configured to receive the alternating voltage through at least one alternating voltage input terminal and outputting a constant direct current to the LED load, wherein, the constant current control circuit includes a constant current control chip at least having a maximum on-time pin; and a three-stage dimming detection control circuit including a variable control resistor for three-stage dimming control, the three-stage dimming detection control circuit is controlled by the alternating voltage received by at least one alternating voltage input terminal so that the variable control resistor is connected to the maximum on-time pin with different resistance values, and the constant current control chip is controlled according to a resistance value of the variable control resistor connected to the maximum on-time pin so that the constant current control circuit outputs three different current levels.

In this way, level of an output current of the constant current control chip is adjusted by adjusting a resistance value of a resistor connected between the maximum on-time pin of the constant current control chip and the ground to perform dimming, thereby switching action pins DET1 and DET2 of the constant current control chip are not necessary, so that the constant current control chip is big in selection freedom, larger in circuit design space, low in cost and simple in circuit structure.

Further, according to an embodiment of the present disclosure, the two alternating voltage input terminals include a first alternating voltage input terminal and a second alternating voltage input terminal, and the three-stage dimming detection control circuit further includes: a first voltage division circuit having an input end connected to the first alternating voltage input terminal; a second voltage division circuit having an input end connected to the second alternating voltage input terminal; a first switching transistor having a control end connected to an output end of the first voltage division circuit; and a second switching transistor having a control end connected to an output end of the second voltage division circuit, wherein, the first switching transistor is turned on when the first alternating voltage input terminal receives the alternating voltage, thereby a first control resistor is connected between the maximum on-time pin and the ground of the constant current control chip, the second switching transistor is turned on when the second alternating voltage input terminal receives the alternating voltage, thereby a second control resistor is connected between the maximum on-time pin and the ground of the constant current control chip, the first switching transistor and the second switching transistor are turned on when the first alternating voltage input terminal and the second alternating voltage input terminal both receive the alternating voltage, thereby a third control resistor is connected between the maximum on-time pin and the ground of the constant current control chip, wherein the first control resistor, the second control resistor and the third control resistor have different resistance values.

In this way, by separately controlling the first switching transistor and the second switching transistor to be turned on, the resistors having different resistance values could be connected to the maximum on-time pin of the constant current control chip, thereby the three-stage dimming control of the LED lamp is achieved by means of the simple circuit structure.

Further, according to an embodiment of the present disclosure, the variable control resistor includes: a first resistor having one end connected to the maximum on-time pin and the other end connected to a first connection end of the first switching transistor, a second connection end of the first switching transistor is grounded; and a second resistor having one end connected to the maximum on-time pin and the other end connected to a first connection end of the second switching transistor, a second connection end of the second switching transistor is grounded.

Further, the variable control resistor further includes: a third resistor having one end connected to the maximum on-time pin and the other end being grounded.

Further, a resistance value of the first control resistor is equal to a resistance value of the first resistor, a resistance value of the second control resistor is equal to a resistance value of the second resistor, and a resistance value of the third control resistor is equal to a resistance value obtained by parallel connection of the first resistor and the second resistor.

Further, the resistance value of the first control resistor is equal to a resistance value obtained by parallel connection of the first resistor and the third resistor, the resistance value of the second control resistor is equal to a resistance value obtained by parallel connection of the second resistor and the third resistor, and the resistance value of the third control resistor is equal to a resistance value obtained by parallel connection of the first resistor, the second resistor and the third resistor.

In this way, by controlling a parallel connection combination manner between multiple resistors, the resistor connected to the maximum on-time pin of the constant current control chip is adjusted, thus the three-stage dimming control of the LED lamp is achieved by the simple circuit structure.

Further, according to an embodiment of the present disclosure, the variable control resistor includes: a first resistor having one end being grounded and the other end connected to a first connection end of the second switching transistor, wherein a second connection end of the second switching transistor is grounded; a second resistor having one end connected to the other end of the first resistor; and a third resistor having one end connected to the maximum on-time pin and the other end connected to a first connection end of the first switching transistor and the other end of the second resistor, and a second connection end of the first switching transistor is connected to the other end of the first resistor.

Further, according to an embodiment of the present disclosure, the resistance value of the first control resistor is equal to a resistance value obtained by serial connection of the first resistor and the third resistor, the resistance value of the second control resistor is equal to a resistance value obtained by serial connection of the second resistor and the third resistor, and the resistance value of the third control resistor is equal to the resistance value of the third resistor.

In this way, by controlling a serially connected combination manner between multiple resistors, the resistor connected to the maximum on-time pin of the constant current control chip is adjusted, thus the three-stage dimming control of the LED lamp is achieved by the simple circuit structure.

Further, according to an embodiment of the present disclosure, the first voltage division circuit includes a first capacitor, a fourth resistor and a fifth resistor which are used for voltage division.

Further, according to an embodiment of the present disclosure, the first capacitor is connected between an output end of the first voltage division circuit and the ground, the fourth resistor is connected between the output end of the first voltage division circuit and the ground, one end of the fifth resistor is connected to the first alternating voltage input terminal, and the other end of the fifth resistor is connected to the output end of the first voltage division circuit.

In this way, the voltage input to the control end of the first switching transistor is more stable, thereby the three-stage dimming control may be stably performed.

Further, according to an embodiment of the present disclosure, the second voltage division circuit includes a second capacitor, a sixth resistor and a seventh resistor which are used for voltage division.

Further, according to an embodiment of the present disclosure, the second capacitor is connected between an output end of the second voltage division circuit and the ground, the sixth resistor is connected between the output end of the second voltage division circuit and the ground, one end of the seventh resistor is connected to the second alternating voltage input terminal, and the other end of the seventh resistor is connected to the output end of the second voltage division circuit.

In this way, the voltage input to the control end of the second switching transistor is more stable, thereby the three-stage dimming control may be stably performed.

Further, according to an embodiment of the present disclosure, the constant current control circuit includes a main switching transistor, the main switching transistor is provided inside the constant current control chip, in the interior of the constant current control chip, a gate pin of the main switching transistor is connected with a control pin of the constant current control chip, or the constant current control circuit includes a main switching transistor, the main switching transistor is provided outside the constant current control chip, and a gate pin of the main switching transistor is connected with a control pin of the constant current control chip.

In this way, a low-power driving circuit or a high-power driving circuit may be achieved according to the need.

Further, according to an embodiment of the present disclosure, the constant current control circuit includes: a rectifying and filtering circuit for receiving the alternating voltage by means of the at least one alternating voltage input terminal and performing rectification filtering processing on the alternating voltage so as to output a direct voltage; and a Direct Current (DC)-DC constant current circuit including the constant current control chip and receiving the direct voltage from the rectifying and filtering circuit and converting the direct voltage into a constant current so as to output same to the LED load.

In this way, the driving circuit may perform the rectification filtering on the alternating voltage, so that the required direct current may be output to the LED load.

Further, according to an embodiment of the present disclosure, the first voltage division circuit further includes a first voltage regulator tube being connected between the output end of the first voltage division circuit and the ground.

Further, according to an embodiment of the present disclosure, the second voltage division circuit further includes a second voltage regulator tube being connected between the output end of the second voltage division circuit and the ground.

In this way, in the case of large interference or overcharge in the driving circuit, the influence of the interference may be eliminated and the overcharge may be avoided. It is to be noted that the first voltage regulator tube and the second voltage regulator tube are not necessary, for example, in the case of small interference or overcharge in the driving circuit, the first voltage regulator tube and the second voltage regulator tube may be omitted.

According to another aspect of the present disclosure, an LED lamp is provided, and the LED lamp includes an LED load and the above driving circuit, the driving circuit is configured to drive the LED load.

According to the driving circuit for the LED lamp of the present disclosure, by adjusting the resistance value of the resistor connected between the maximum on-time pin of the constant current control chip and the ground, the level of the output current of the constant current control chip can be adjusted for dimming, thereby the driving circuit with low cost and good platform compatibility is achieved, and because the switching action pins DET1 and DET2 of the constant current control chip are not required to be used, the circuit design space is larger.

BRIEF DESCRIPTION OF THE DRAWINGS

Drawings of the description for constituting a part of the present application are used to provide further understanding of the present disclosure, exemplary embodiments of the present disclosure and description thereof are used to explain the present disclosure, rather than constituting improper limitation to the present disclosure. In the drawings.

DETAILED DESCRIPTION OF THE EMBODIMENTS

Figure 1:
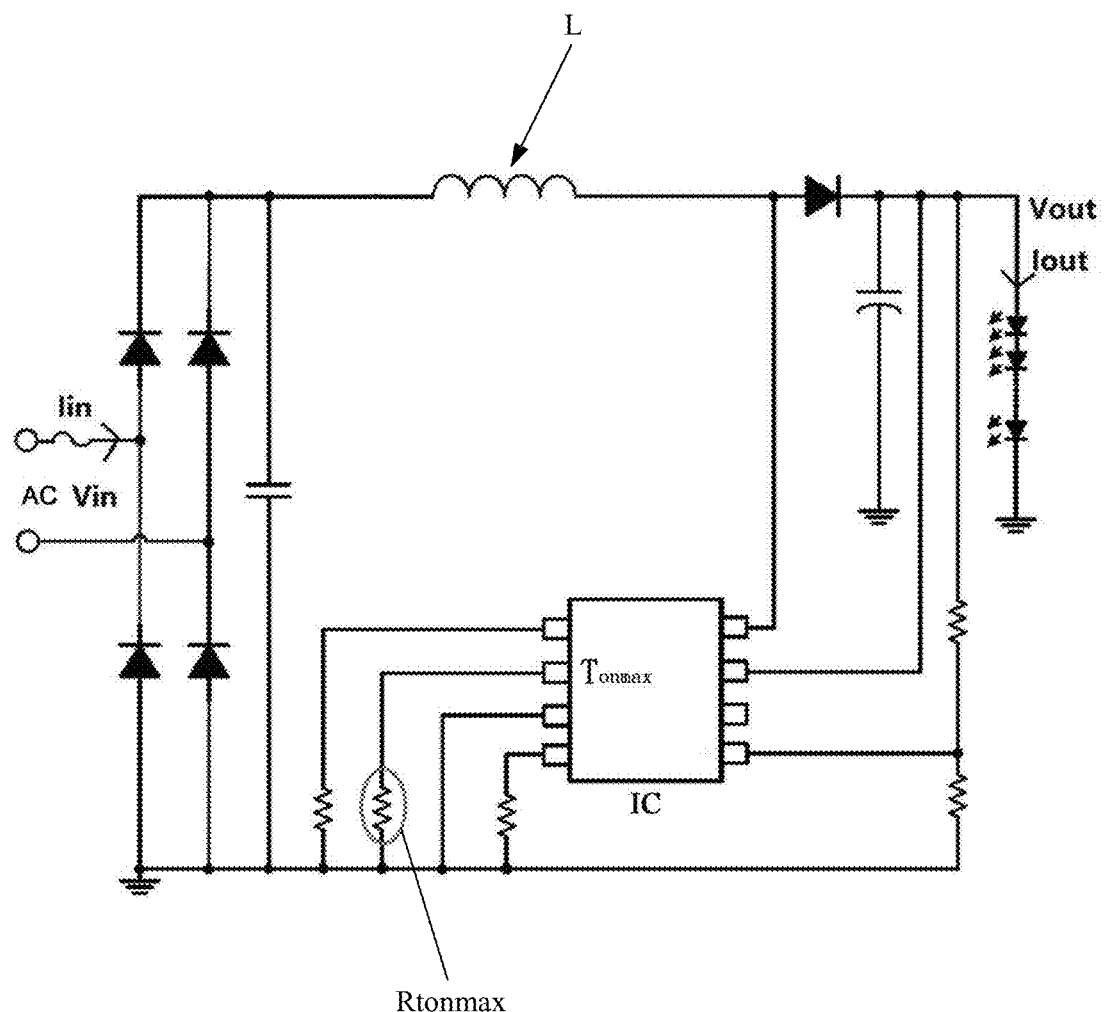
FIG. 1 is a simplified circuit diagram of a three-stage dimming control operating principle of a driving circuit for an LED load according to the present disclosure.

It is to be noted that in the case without conflicting, embodiments in the present application and features in the embodiments may be mutually combined. The present disclosure is described in detail below with reference to the drawings and in combination with the embodiments.

It is to be noted that unless otherwise specified, all technical and scientific terms used in the present application have the same meanings as commonly understood by those of ordinary skill in the art of the present application.

In the present disclosure, in the case without contrary description, orientation words used such as "up, down, top and bottom" usually refer to directions as shown in the drawings, or refer to upright, vertical or gravitational directions of a component itself; similarly, in order to understand and describe conveniently, "inner and outer" refer to the inner and outer relative to an outline of each component itself, but the above orientation words are not used to limit the present disclosure.

Firstly, a three-stage dimming control operating principle of a driving circuit for an LED load according to the present disclosure is described with reference to FIG. 1, and FIG. 1 is a simplified circuit diagram of the three-stage dimming control operating principle of the driving circuit for the LED load according to the present disclosure.

When a constant current control chip IC is in a closed-loop state, a current Iout output by the driving circuit may be represented as the following formula (1):

$$Iout = \frac{Vcsref}{2*Rcs} \quad (1)$$

Herein, Vcsref is a voltage input to the constant current control chip IC, Rcs is a resistance of the constant current control chip, at this state, brightness of an LED lamp is 100%.

When the constant current control chip IC is in an open-loop state, the current Iout output by the driving circuit may be represented as the following formula (2):

$$Iout \approx \frac{V_{inrms}^2 * Ton\max}{2*Lm*Vout} \quad (2)$$

Herein, $V_{inrms}$ is an input voltage of the driving circuit, Tonmax is maximum on-time of the constant current control chip IC, namely, maximum on-time of a main switching transistor inside the constant current control chip IC, Lm is an inductance value of an inductance L, and Vout is an output voltage of the driving circuit. It may be seen from the above formula (2) that the output current of the driving circuit is proportional to the maximum on-time Tonmax of the constant current control chip IC, and the output current of the driving circuit may be adjusted by adjusting the maximum on-time Tonmax of the constant current control chip IC.

Figure 2:
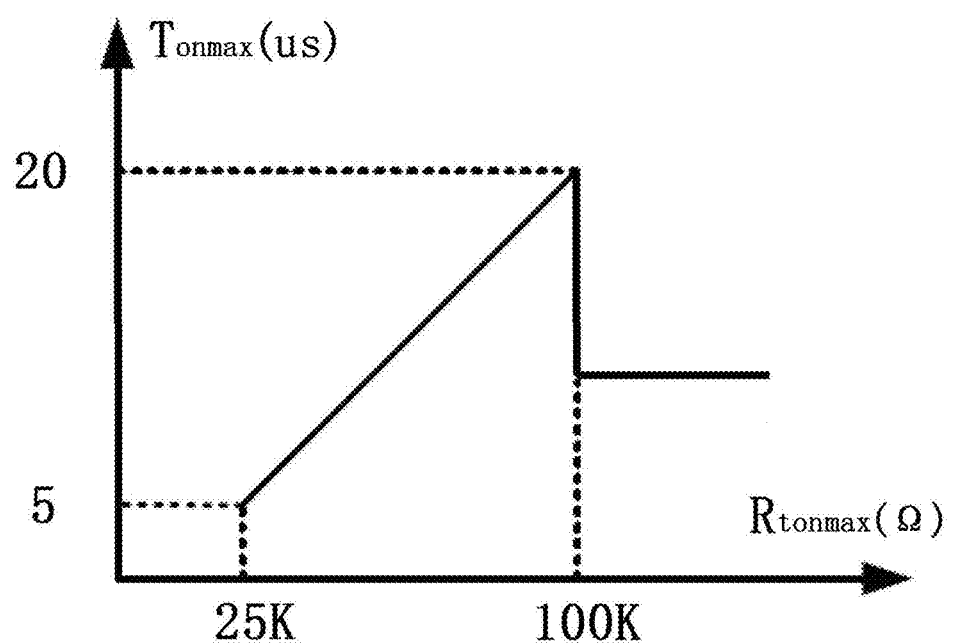
FIG. 2 is a curve diagram for describing a relation between maximum on-time of a constant current control chip of the driving circuit for the LED load and a resistance of a resistor connected to a maximum on-time pin.

In addition, the maximum on-time Tonmax of the constant current control chip IC depends on a resistance value of a resistor Rtonmax connected between a maximum on-time pin Tonmax of the constant current control chip IC and the ground of the constant current control chip IC, as shown in FIG. 2. Therefore, because the maximum on-time of the constant current control chip is proportional to a resistance value of a grounded resistor connected to the maximum on-time pin, the resistance value is adjusted so that the constant current control chip controls the maximum on-time of the main switching resistor by means of an internal circuit, thereby the maximum on-time of the main switching resistor is changed within a range allowed by the chip to control the output current Iout of the driving circuit.

Figure 3:
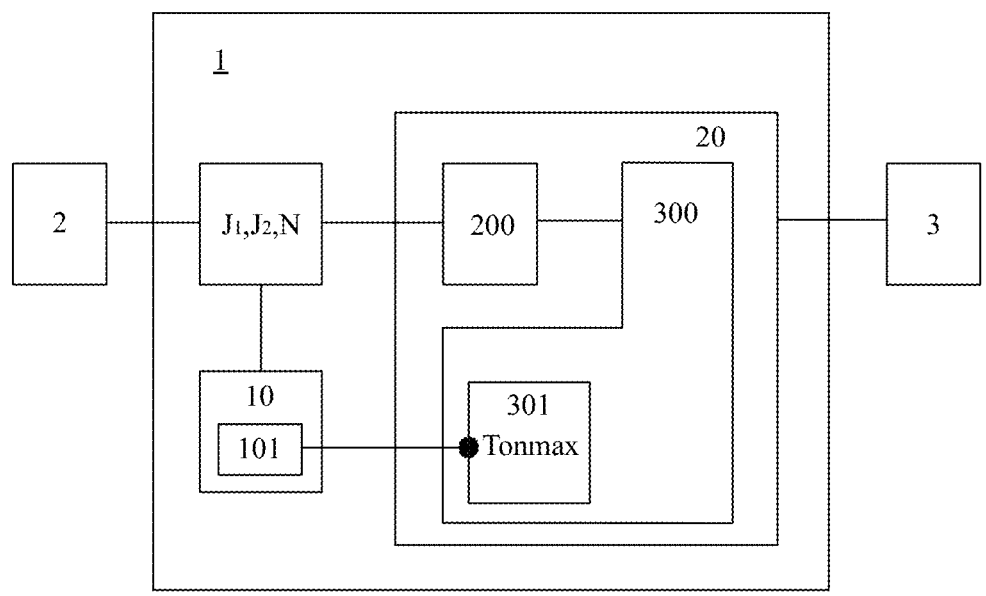
FIG. 3 is a block diagram of the driving circuit for the LED load according to the present disclosure.

FIG. 3 is a block diagram of the driving circuit for the LED lamp using the above operating principle according to the present disclosure. As shown in FIG. 3, the driving circuit 1 for the LED lamp includes a first alternating voltage input terminal J1, a second alternating voltage input terminal J2 and a common terminal N, the first alternating voltage input terminal J1 and the second alternating voltage input terminal J2 are configured to receive an alternating voltage from an external power supply 2; a constant current control circuit 20 configured to receive the alternating voltage through at least one alternating voltage input terminal in the first alternating voltage input terminal J1 and the second alternating voltage input terminal J2 and outputting a constant direct current to an LED load 3, the constant current control circuit 20 includes a constant current control chip 301, and the constant current control chip 301 at least has a maximum on-time pin Tonmax; and a three-stage dimming detection control circuit 10 including a variable control resistor 101 for three-stage dimming control, the three-stage dimming detection control circuit 10 is controlled by the alternating voltage received by at least one alternating voltage input terminal in the first alternating voltage input terminal J1 and the second alternating voltage input terminal J2 so that the variable control resistor 101 is connected to the maximum on-time pin Tonmax of the constant current control chip 301 with different resistance values, and the constant current control chip 301 is controlled according to a resistance value of the variable control resistor 101 connected to the maximum on-time pin Tonmax to output three different current levels.

In this way, by adjusting a resistance value of a resistor connected between the maximum on-time pin Tonmax of the constant current control chip 301 and the ground of the constant current control chip, a level of an output current of the constant current control chip 301 is adjusted for dimming, thereby the driving circuit with low cost and good platform compatibility may be achieved, and the constant current control chip provided with switching action pins DET1 and DET2 is not required to be used, thus a circuit design space is larger, a selection freedom of the constant current control chip is big, and the constant current control chip is low in cost and simple in circuit structure.

Specifically, the constant current control circuit 20 includes a rectifying and filtering circuit 200 configured to receive the alternating voltage through at least one alternating voltage input terminal in the first alternating voltage input terminal J1 and the second alternating voltage input terminal J2 and perform rectification filtering processing on the alternating voltage so as to output a direct voltage, herein, the direct voltage is a direct voltage with a certain ripple; and a DC-DC constant current circuit 300 configured to receive the direct voltage from the rectifying and filtering circuit 200 and invert the direct voltage into a constant current so as to output same to the LED load 3, and the DC-DC constant current circuit 300 includes the constant current control chip 301.

The above is a general description of an inventive concept of the present disclosure, and the circuit diagram of the driving circuit for the LED lamp according to the present disclosure is described in detail below.

Figure 4A:
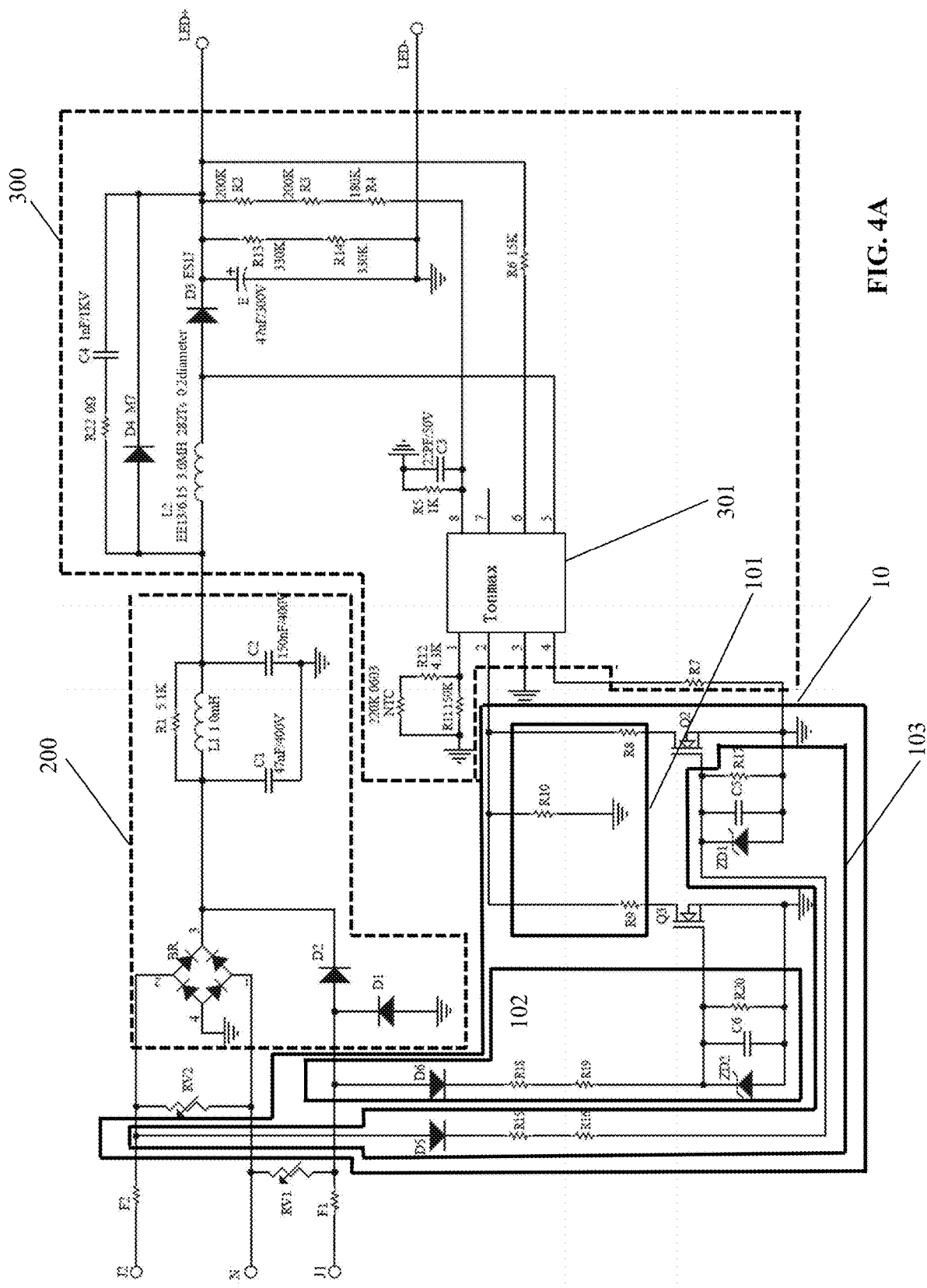
FIG. 4A to FIG. 4D are circuit diagrams of the driving circuit for the LED load according to a first implementation mode of the present disclosure.
Figure 4B:
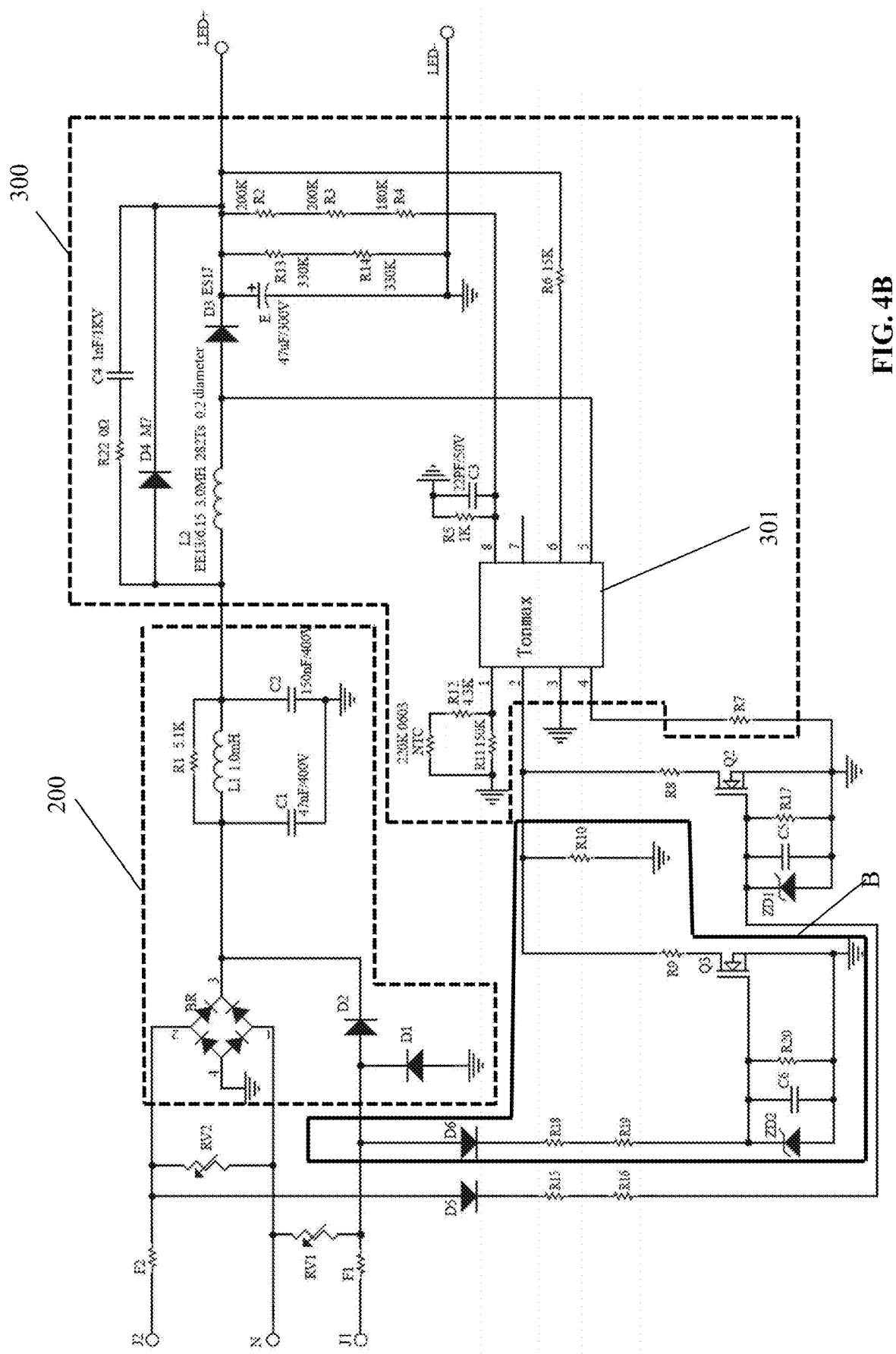
Figure 4C:
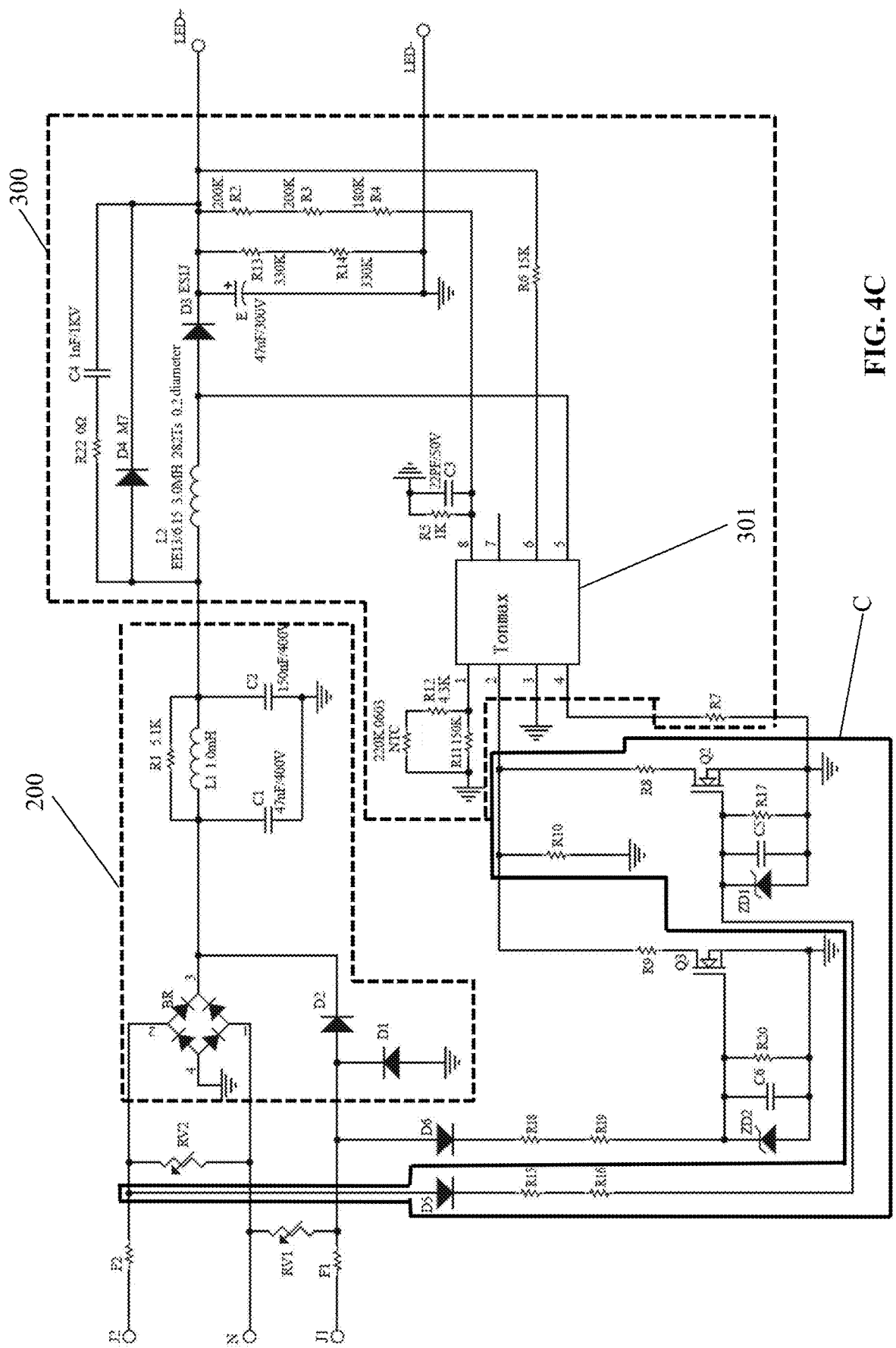
Figure 4D:
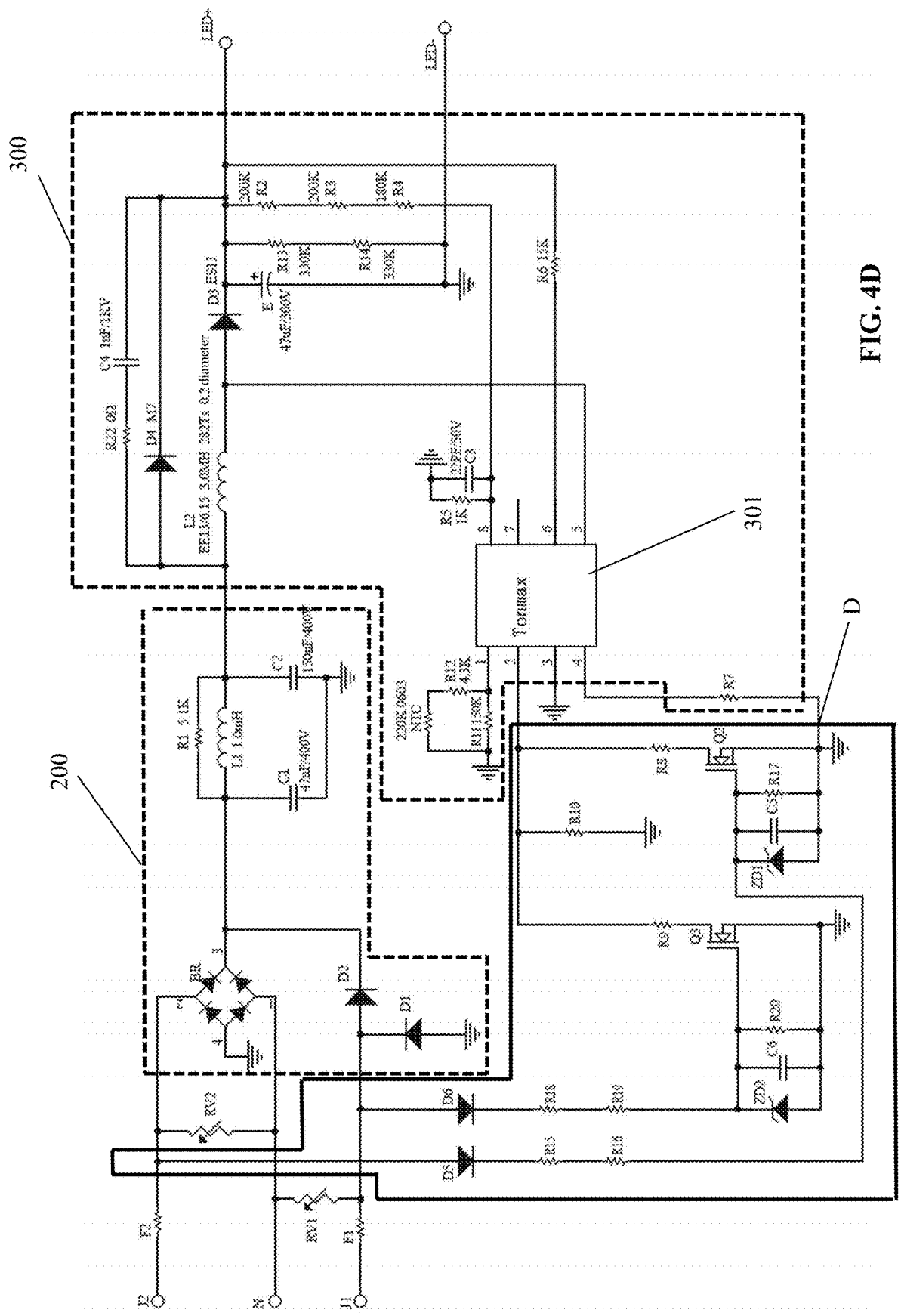

FIG. 4A to FIG. 4D are circuit diagrams of the driving circuit for the LED lamp according to a first implementation mode of the present disclosure, FIG. 4A shows a circuit block diagram of the driving circuit for the LED lamp according to the first implementation mode of the present disclosure. FIG. 4B to FIG. 4D are circuit diagrams of an operating process of the driving circuit for the LED lamp according to the first implementation mode of the present disclosure. As shown in FIG. 4A, the three-stage dimming detection control circuit 10 includes: a variable control resistor 101 having one end connected to the maximum on-time pin Tonmax of the constant current control chip 301; a first voltage division circuit 102 having an input end connected to the first alternating voltage input terminal J1; a second voltage division circuit 103 having an input end connected to the second alternating voltage input terminal J2; a first switching transistor Q3 having a control end connected to an output end of the first voltage division circuit 102; and a second switching transistor Q2 having a control end of connected to an output end of the second voltage division circuit 103.

The first switching transistor Q3 is turned on when the first alternating voltage input terminal J1 receives the alternating voltage, thereby a first control resistor is connected between the maximum on-time pin Tonmax of the constant current control chip 301 and the ground of the constant current control chip 301, the second switching transistor Q2 is turned on when the second alternating voltage input terminal J2 receives the alternating voltage, thereby a second control resistor is connected between the maximum on-time pin Tonmax of the constant current control chip 301 and the ground of the constant current control chip 301, the first switching transistor Q3 and the second switching transistor Q2 are turned on when the first alternating voltage input terminal J1 and the second alternating voltage input terminal J2 both receive the alternating voltage, thereby a third control resistor is connected between the maximum on-time pin Tonmax of the constant current control chip 301 and the ground of the constant current control chip 301, and resistance values of the first control resistor, the second control resistor and the third control resistor are different, as described in detail below.

Specifically, the variable control resistor 101 may include: a first resistor R9 having one end connected to the maximum on-time pin Tonmax and the other end connected to a first connection end of the first switching transistor Q3, a second connection end of the first switching transistor Q3 is grounded; and a second resistor R8 having one end connected to the maximum on-time pin Tonmax and the other end connected to a first connection end of the second switching transistor Q2, a second connection end of the second switching transistor Q2 is grounded.

In addition, as shown in FIG. 4A, the variable control resistor 101 may further include: a third resistor R10 having one end connected to the maximum on-time pin Tonmax and the other end being grounded. It is to be noted that the third resistor R10 is not necessary, namely, the third resistor R10 may be omitted.

In a circuit structure of the variable control resistor 101 including the third resistor R10, when the first alternating voltage input terminal J1 receives the alternating voltage so that the first switching transistor Q3 is turned on, the first control resistor is connected between the maximum on-time pin Tonmax and the ground of the constant current control chip 301, a resistance value of the first control resistor is equal to a resistance value obtained by parallel connection of the first resistor R9 and the third resistor R10; when the second alternating voltage input terminal J2 receives the alternating voltage so that the second switching transistor Q2 is turned on, the second control resistor is connected between the maximum on-time pin Tonmax and the ground of the constant current control chip 301, a resistance value of the second control resistor is equal to a resistance value obtained by parallel connection of the second resistor R8 and the third resistor R10; when the first alternating voltage input terminal J1 and the second alternating voltage input terminal J2 both receive the alternating voltage so that the first switching transistor Q3 and the second switching transistor Q2 are turned on, the third control resistor is connected between the maximum on-time pin Tonmax and the ground of the constant current control chip 301, a resistance value of the third control resistor is equal to a resistance value obtained by parallel connection of the first resistor R9, the second resistor R8 and the third resistor R10. Based on such a circuit structure, three-stage current adjustment of the constant current control circuit can be implemented in arbitrary proportions.

In a circuit structure of the variable control resistor 101 excluding the third resistor R10, when the first alternating voltage input terminal J1 receives the alternating voltage so that the first switching transistor Q3 is turned on, the first control resistor of which the resistance value is equal to the resistance value of the first resistor R9 is connected between the maximum on-time pin Tonmax and the ground of the constant current control chip 301, when the second alternating voltage input terminal J2 receives the alternating voltage so that the second switching transistor Q2 is turned on, the second control resistor of which the resistance value is equal to the resistance value of the second resistor R8 is connected between the maximum on-time pin Tonmax and the ground of the constant current control chip 301, when the first alternating voltage input terminal J1 and the second alternating voltage input terminal J2 both receive the alternating voltage so that the first switching transistor Q3 and the second switching transistor Q2 are turned on, the third control resistor of which the resistance value is equal to the resistance value obtained by the parallel connection of the first resistor R9 and the second resistor R8 is connected between the maximum on-time pin Tonmax and the ground of the constant current control chip 301. Based on such a circuit structure, current adjustment of the constant current control circuit may be implemented in certain specific proportions.

In addition, the first voltage division circuit 102 may include a first capacitor C6 connected between an output end of the first voltage division circuit 102 and the ground; a fourth resistor R20 connected between the output end of the first voltage division circuit 102 and the ground; a fifth resistor having one end connected to the first alternating voltage input terminal J1 and the other end connected to the output end of the first voltage division circuit 102. In the circuit diagram as shown in FIG. 4A, the fifth resistor is formed by serially connecting the resistor R18 and the resistor R19, wherein one end of the resistor R18 is connected to the first alternating voltage input terminal J1, the other end thereof is connected to one end of the resistor R19, and the other end of the resistor R19 is connected to the output end of the first voltage division circuit 102.

Optionally, the first voltage division circuit 102 may include a first Zener Diode (ZD) 2, herein the first zener diode ZD 2 is connected between the output end of the first voltage division circuit 102 and the ground; and a first diode D6 of which a positive electrode is connected to the first alternating voltage input terminal J1, and a negative electrode is connected to one end of the resistor R18.

The second voltage division circuit 103 may include a second capacitor C5 connected between an output end of the second voltage division circuit 103 and the ground; a sixth resistor R17 connected between the output end of the second voltage division circuit 103 and the ground; and a seventh resistor having one end connected to the second alternating voltage input terminal J2 and the other end connected to the output end of the second voltage division circuit 103, in the circuit diagram as shown in FIG. 4A, the seventh resistor is formed by serially connecting the resistors R15 and R16, and one end of the resistor R15 is connected to the second alternating voltage input terminal J2, the other end thereof is connected to one end of the resistor R16, and the other end of the resistor R16 is connected to the output end of the second voltage division circuit 103.

Optionally, the second voltage division circuit 103 may further include a second zener diode ZD1 connected between the output end of the second voltage division circuit 103 and the ground; and a second diode D5, of which a positive electrode is connected to the second alternating voltage input terminal J2, and a negative electrode is connected to one end of the resistor R15.

Through the first zener diode ZD2 and the second zener diode ZD1, the switching transistors of the first voltage division circuit 102 and the second voltage division circuit 103 may be protected from being burned out or turned on by mistake, the reliability of the circuit is improved. On the other hand, the first zener diode and the second zener diode are not necessary, for example, in the case of small interference or overcharge in the driving circuit, the first zener diode and the second zener diode may be omitted.

An operating process of three-stage dimming control of the three-stage dimming detection control circuit including the third resistor R10 is further described below with reference to FIG. 4B to FIG. 4D.

As shown in FIG. 4A and FIG. 4B, when the first alternating voltage input terminal J1 and the common terminal N are connected to the external power supply for receiving the alternating voltage, the received alternating voltage on one way is rectified and filtered by the rectifying and filtering circuit 200 and then the rectifying and filtering circuit 200 outputs the direct voltage having a certain ripple to the DC-DC constant current circuit 300; and the received alternating voltage on the other way, is voltage-divided by the resistors R18, R19 and R20 of the first voltage division circuit 102 of the three-stage dimming detection control circuit 10 as shown in a block diagram B of FIG. 4B, the divided voltage is provided to the control end of the first switching transistor Q3, so that the first switching transistor Q3 is turned on, thereby the first resistor R9 is connected between the maximum on-time pin Tonmax of the constant current control chip 301 and the ground of the constant current control chip 301, thus the resistance value of the first control resistor connected between the maximum on-time pin Tonmax of the constant current control chip 301 and the ground of the constant current control chip 301 is equal to the resistance value obtained by the parallel connection of the first resistor R9 and the third resistor R10, namely, the first control resistor is equal to $$\frac{R10*R9}{R10+R9},$$

therefore the constant current control chip 301 controls the DC-DC constant current circuit 300 to output a first current level to the LED load according to the first control resistor connected to the maximum on-time pin Tonmax of the constant current control chip 301, thus light having first brightness is obtained.

As shown in FIG. 4A and FIG. 4C, when the second alternating voltage input terminal J2 and the common terminal N are connected to the external power supply for receiving the alternating voltage, the received alternating voltage on one way is rectified and filtered by the rectifying and filtering circuit 200, and then the rectifying and filtering circuit 200 outputs the direct voltage with a certain ripple to the DC-DC constant current circuit 300, and the received alternating voltage on the other way is voltage-divided by the resistors R15, R16 and R17 of the second voltage division circuit 103 of the three-stage dimming detection control circuit 10 as shown in a block diagram C of FIG. 4C, the divided voltage is provided to the control end of the second switching transistor Q2, so that the second switching transistor Q2 is turned on, thereby the second resistor R8 is connected between the maximum on-time pin Tonmax of the constant current control chip 301 and the ground of the constant current control chip 301, thus the resistance value of the second control resistor connected between the maximum on-time pin Tonmax of the constant current control chip 301 and the ground of the constant current control chip 301 is equal to the resistance value obtained by the parallel connection resistance of the second resistor R8 and the third resistor R10, namely, the second control resistor is equal to $$\frac{R10*R8}{R10+R8},$$

therefore the constant current control chip 301 controls the DC-DC constant current circuit 300 to output a second current level to the LED load according to the second control resistor connected to the maximum on-time pin Tonmax of the constant current control chip 301, thus light having second brightness is obtained.

As shown in FIG. 4A and FIG. 4D, when the first alternating voltage input terminal J1 and the second alternating voltage input terminal J2 are in short circuit and connected to the external power supply for receiving the alternating voltage with the common terminal N, the received alternating voltage on one way is rectified and filtered by the rectifying and filtering circuit 200, and then the rectifying and filtering circuit 200 outputs the direct voltage with a certain ripple to the DC-DC constant current circuit 300, and the received alternating voltage on the other way passes through the first voltage division circuit 102 and the second voltage division circuit 103 of the three-stage dimming detection control circuit 10 as shown in the block diagram D of FIG. 4D, and is voltage-divided by the resistors R18, R19 and R20 of the first voltage division circuit 102, the divided voltage is provided to the control end of the first switching transistor Q3, so that the first switching transistor Q3 is turned on, thereby the first resistor R9 is connected between the maximum on-time pin Tonmax of the constant current control chip 301 and the ground of the constant current control chip; and the received alternating voltage is also voltage-divided by the resistors R15, R16 and R17 of the second voltage division circuit 103, the divided voltage is provided to the control end of the second switching transistor Q2, so that the second switching transistor Q2 is turned on, thereby the second resistor R8 is connected between the maximum on-time pin Tonmax of the constant current control chip 301 and the ground of the constant current control chip.

In this case, the third control resistor connected between the maximum on-time pin Tonmax of the constant current control chip 301 and the ground of the constant current control chip 301 is the parallel connected resistance of the first resistor R9, the second resistor R8 and the third resistor R10, therefore the constant current control chip 301 controls the DC-DC constant current circuit 300 to output a third current level to the LED load according to the third control resistor connected to the maximum on-time pin Tonmax of the constant current control chip 301, thus light having third brightness is obtained.

Therefore, as described above, through adjusting the resistance value of the resistor connected between the maximum on-time pin of the constant current control chip and the ground by the three-stage dimming detection control circuit, the resistance value of the output current of the constant current control chip may be adjusted for dimming, thereby the driving circuit with the low cost and good platform compatibility may be achieved, and the switching action pins DET1 and DET2 of the constant current control chip are not required to be used, the circuit design space is larger.

Figure 5A:
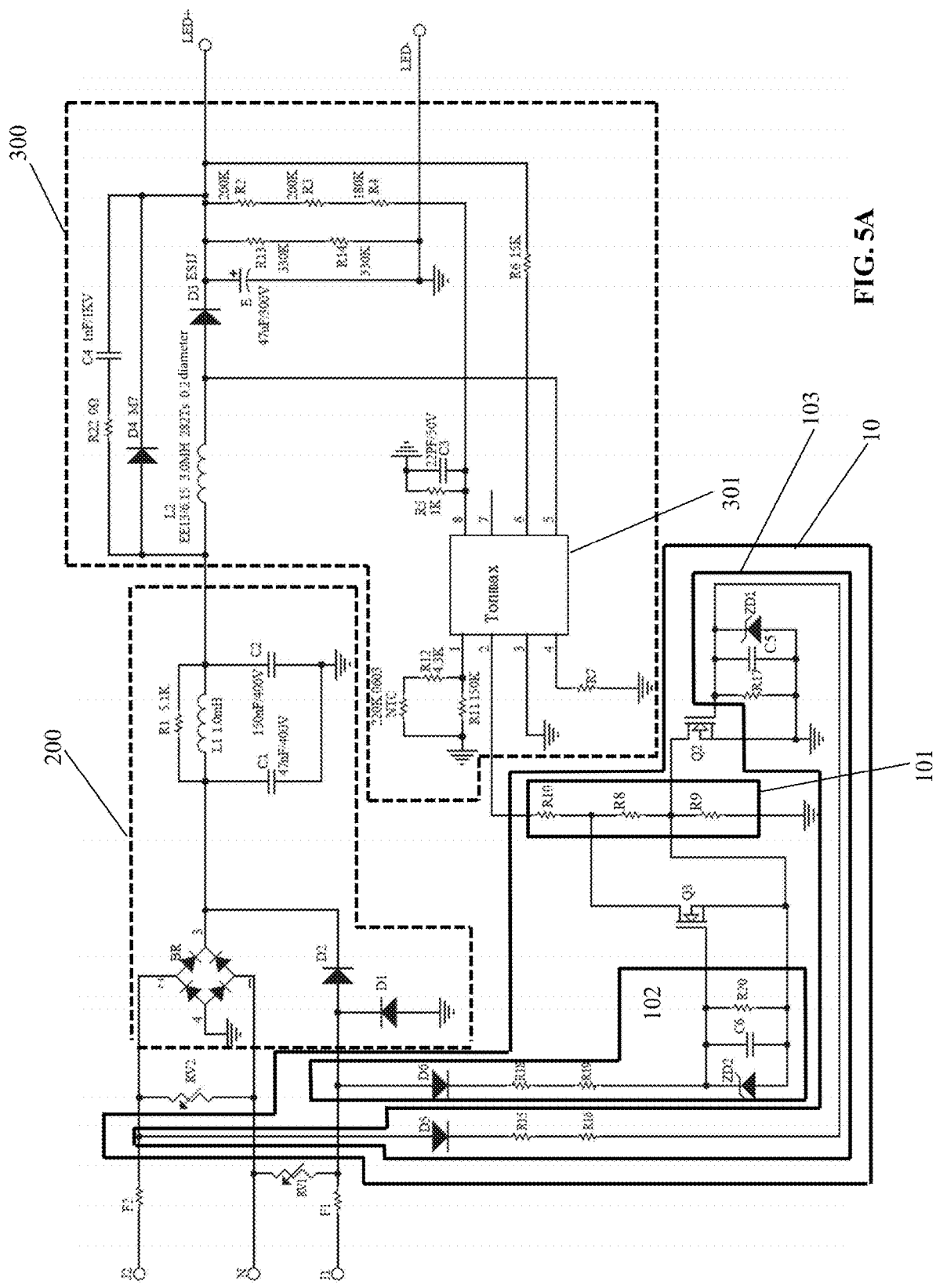
FIG. 5A to FIG. 5D are circuit diagrams of the driving circuit for the LED load according to a second implementation mode of the present disclosure.
Figure 5B:
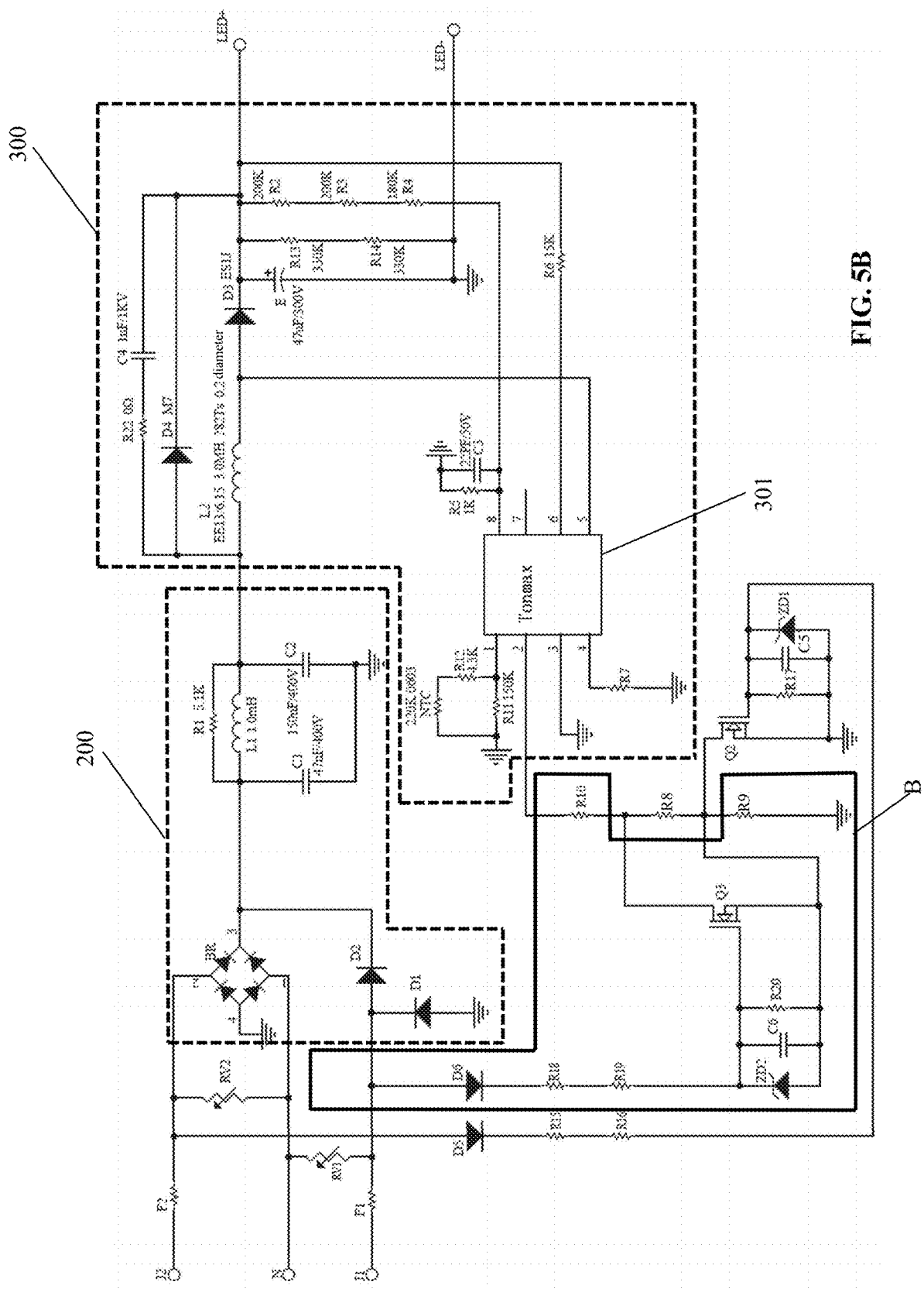
Figure 5C:
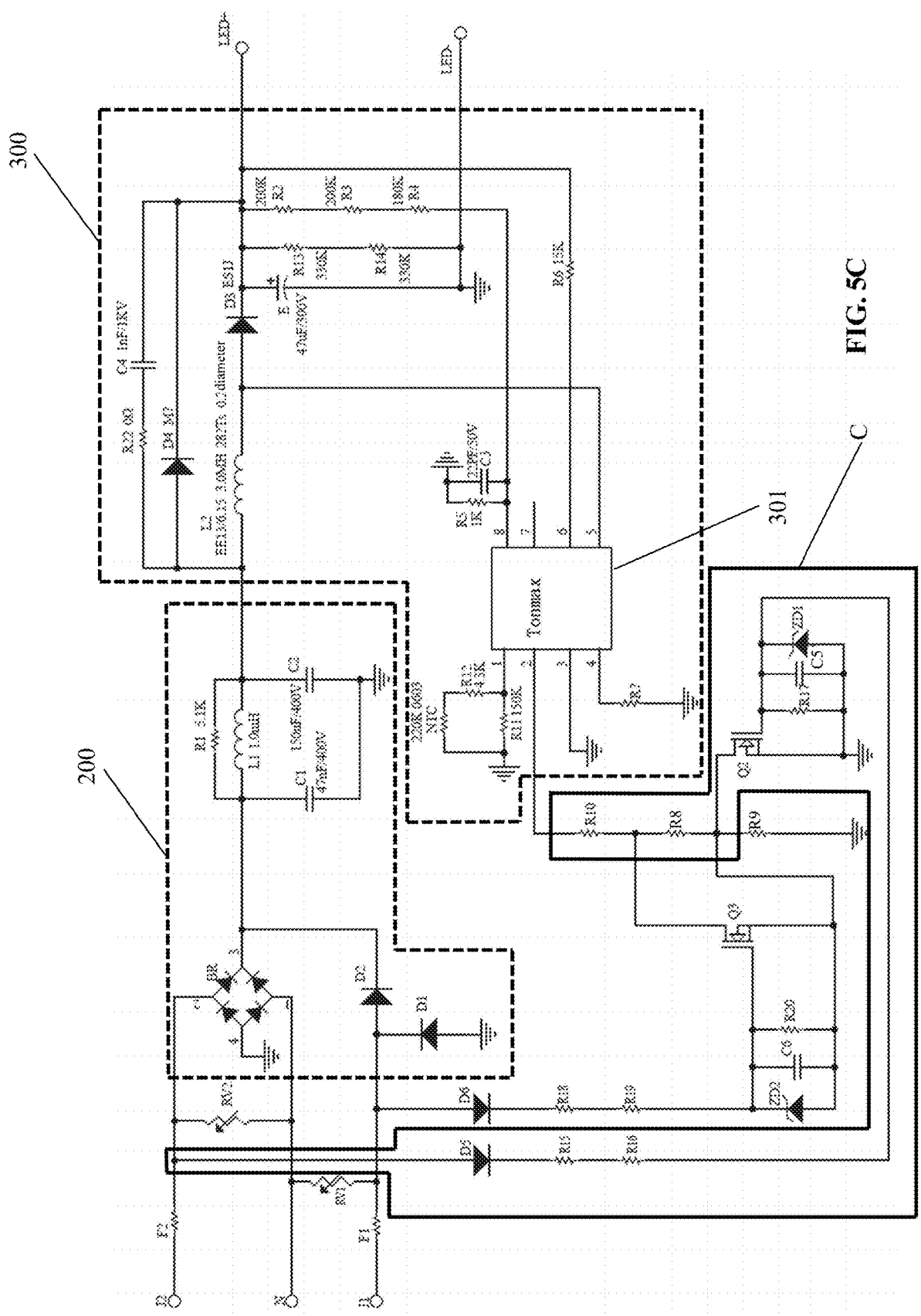
Figure 5D:
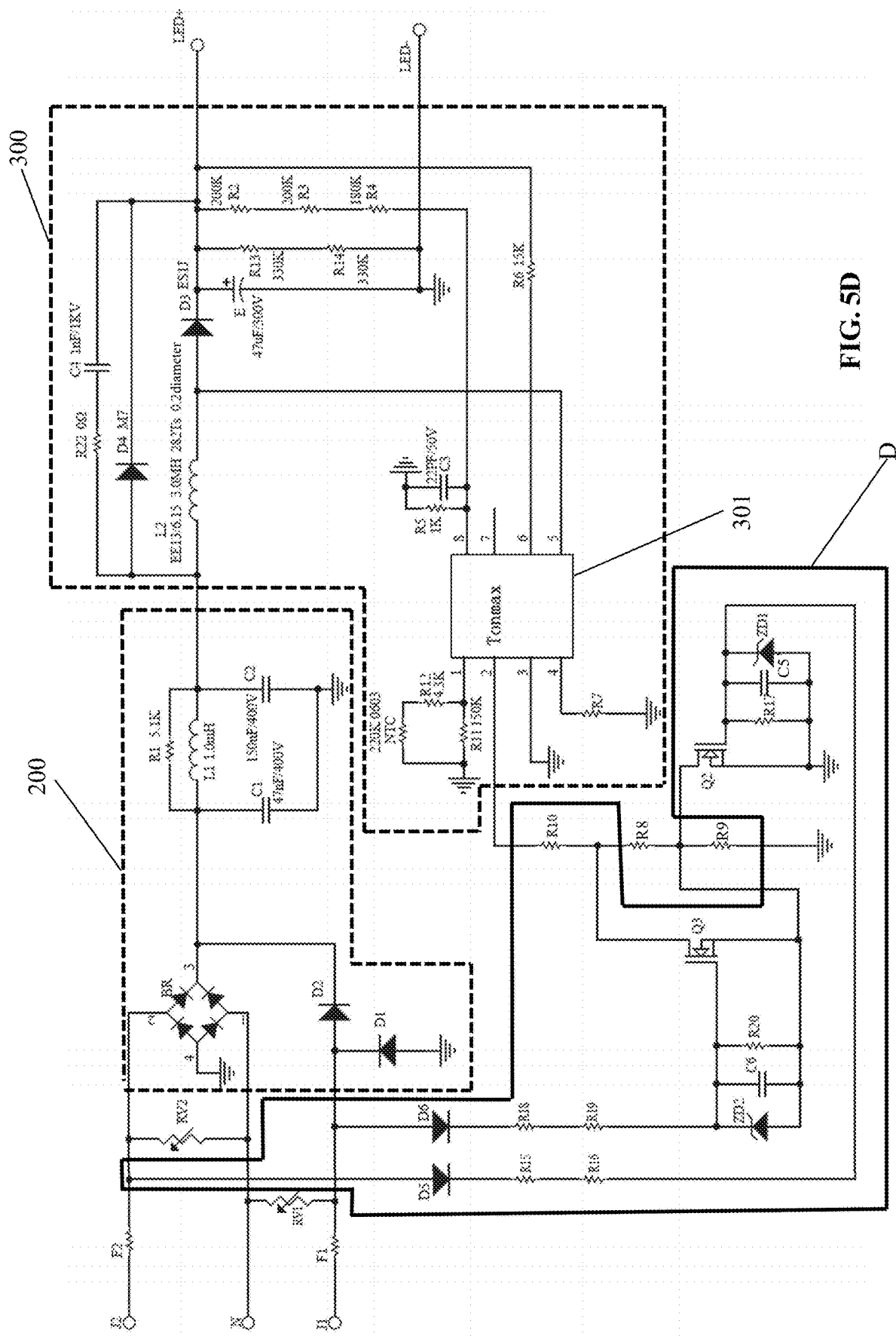

FIG. 5A to FIG. 5D are circuit diagrams of the driving circuit for the LED lamp according to a second implementation mode of the present disclosure, herein, FIG. 5A shows a circuit block diagram of the driving circuit for the LED lamp according to the second implementation mode of the present disclosure, and FIG. 5B to FIG. 5D show a circuit diagram of an operating process of the driving circuit for the LED lamp according to the second implementation mode of the present disclosure. As shown in FIG. 5A, a difference between the implementation mode in FIG. 5A and the implementation mode in FIG. 4A is that in FIG. 5A, connection modes between the first resistor R9, the second resistor R8 and the third resistor R10 included in the variable control resistor 101 are different, as shown in FIG. 5A, one end of the first resistor R9 is grounded, and the other end is connected to the first connection end of the second switching transistor Q2, herein, the second connection end of the second switching transistor Q2 is grounded, one end of the second resistor R8 is connected to the other end of the first resistor R9, and one end of the third resistor R10 is connected to the maximum on-time pin Tonmax, the other end is connected to the first connection end of the first switching transistor Q3 and the other end of the second resistor R8, the second connection end of the first switching transistor Q3 is connected to the other end of the first resistor R9, the others are the same as the implementation mode in FIG. 4A, and repeated descriptions are omitted here.

The operating process of the three-stage dimming control of the three-stage dimming detection control circuit according to the second implementation mode is further described below with reference to FIG. 5B to FIG. 5D.

As shown in FIG. 5A and FIG. 5B, specifically, while the first alternating voltage input terminal J1 and the common terminal N are connected to the external power supply for receiving the alternating voltage, after one route of the received alternating voltage is rectified and filtered by the rectifying and filtering circuit 200, the direct voltage with a certain ripple is output to the DC-DC constant current circuit 300, after the other route is voltage-divided by the resistors R18, R19 and R20 of the first voltage division circuit 102 of the three-stage dimming detection control circuit 10 as shown in a block diagram B of FIG. 5B, the voltage is provided to the control end of the first switching transistor Q3, so that the first switching transistor Q3 is turned on, thereby the third resistor R10 and the first resistor R9 are connected between the maximum on-time pin Tonmax of the constant current control chip 301 and the ground, in this case, the resistance value of the first control resistor is equal to the resistance value of the serially connected resistance of the third resistor R10 and the first resistor R9, namely, the first control resistor is equal to R10+R9, therefore the constant current control chip 301 controls the DC-DC constant current circuit 300 to output a first current value so as to supply power for the LED load according to the first control resistor connected to the maximum on-time pin Tonmax of the constant current control chip 301, thus light in first brightness is obtained.

As shown in FIG. 5A and FIG. 5C, while the second alternating voltage input terminal J2 and the common terminal N are connected to the external power supply for receiving the alternating voltage, after one route of the received alternating voltage is rectified and filtered by the rectifying and filtering circuit 200, the direct voltage with a certain ripple is output to the DC-DC constant current circuit 300, after the other route is voltage-divided by the resistors R15, R16 and R17 of the second voltage division circuit 103 of the three-stage dimming detection control circuit 10 as shown in a block diagram C of FIG. 5C, the voltage is provided to the control end of the second switching transistor Q2, so that the second switching transistor Q2 is turned on, thereby the third resistor R10 and the second resistor R8 are connected between the maximum on-time pin Tonmax of the constant current control chip 301 and the ground, in this case, the resistance value of the second control resistor is equal to the resistance value of the serially connected resistance of the third resistor R10 and the second resistor R8, namely the second control resistor is equal to R10+R8, therefore the constant current control chip 301 controls the DC-DC constant current circuit 300 to output a second current value so as to supply power for the LED load according to the second control resistor connected to the maximum on-time pin Tonmax of the constant current control chip 301, thus light in second brightness is obtained.

As shown in FIG. 5A and FIG. 5D, while the first alternating voltage input terminal J1 and the second alternating voltage input terminal J2 are in short circuit and connected to the external power supply for receiving the alternating voltage with the common terminal N, after one route of the received alternating voltage is rectified and filtered by the rectifying and filtering circuit 200, the direct voltage with a certain ripple is output to the DC-DC constant current circuit 300, after the other route passes through the first voltage division circuit 102 and the second voltage division circuit 103 of the three-stage dimming detection control circuit 10 as shown in the block diagram D of FIG. 5D, and is voltage-divided by the resistors R18, R19 and R20 of the first voltage division circuit 102, the voltage is provided to the control end of the first switching transistor Q3, so that the first switching transistor Q3 is turned on; and after being voltage-divided by the resistors R15, R16 and R17 of the second voltage division circuit 103, the voltage is provided to the control end of the second switching transistor Q2, so that the second switching transistor Q2 is turned on, thereby the third resistor R10 is connected between the maximum on-time pin Tonmax of the constant current control chip 301 and the ground, at this moment, the third control resistor is the third resistor R10, therefore the constant current control chip 301 controls the DC-DC constant current circuit 300 to output a third current value so as to supply power for the LED load according to the third control resistor connected to the maximum on-time pin Tonmax of the constant current control chip 301, thus light in third brightness is obtained.

In the second implementation mode according to the present disclosure, through adjusting the resistance value of the resistor connected between the maximum on-time pin of the constant current control chip and the ground by the three-stage dimming detection control circuit, the resistance value of the output current of the constant current control chip may also be adjusted for dimming, thereby the driving circuit with the low cost and good platform compatibility may be achieved, and the switching action pins DET1 and DET2 of the constant current control chip are not required to be used, the circuit design space is larger.

Figure 6:
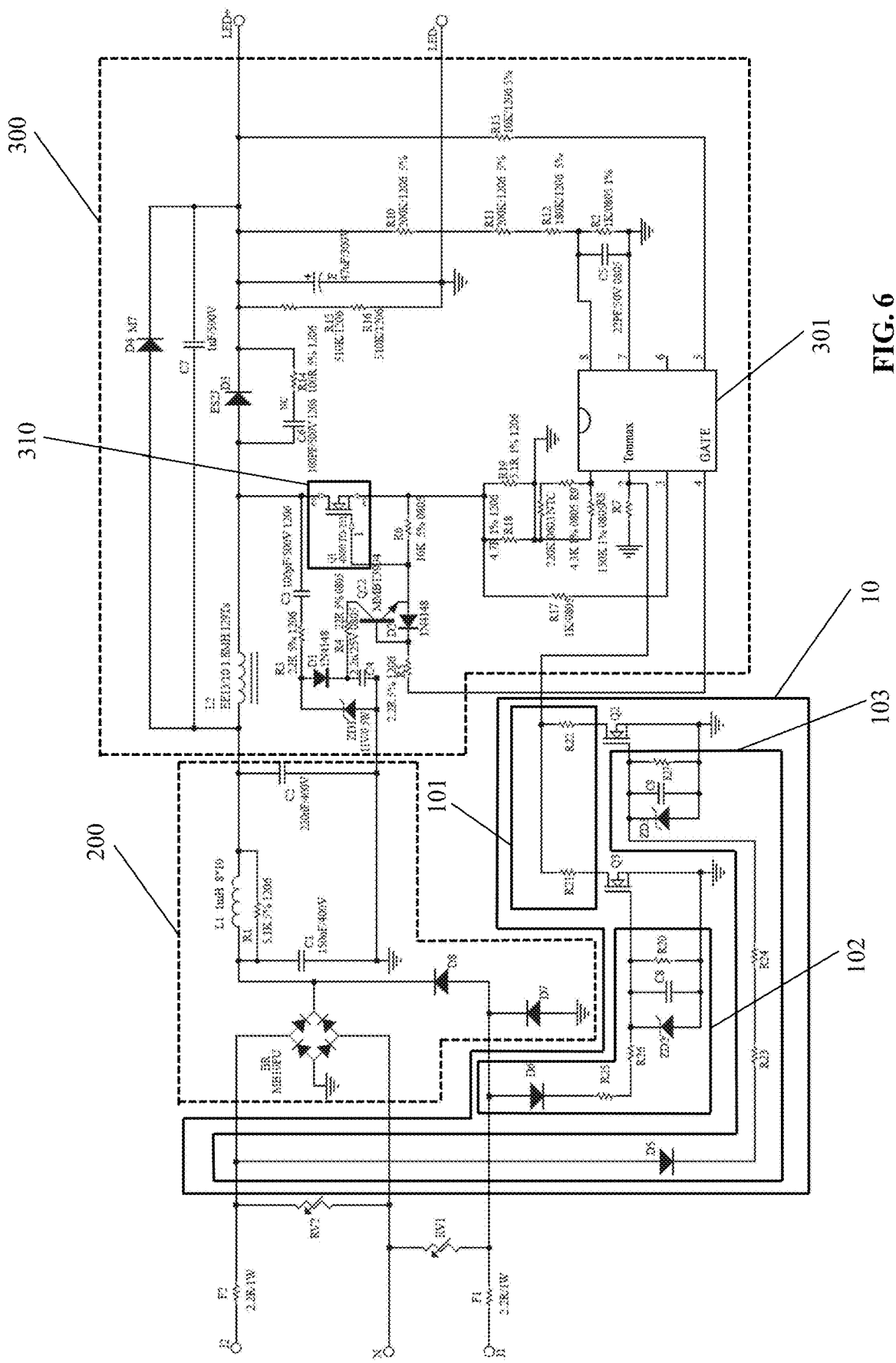
FIG. 6 is a circuit diagram of the driving circuit for the LED load according to a third implementation mode of the present disclosure.

FIG. 6 is a circuit diagram of the driving circuit for the LED load according to a third implementation mode of the present disclosure. The implementation mode in FIG. 6 is similar to the implementation mode in FIG. 4A, a main difference between two parties is that in FIG. 4A, the main switching transistor 310 is installed inside the constant current control chip 301, in the interior of the constant current control chip 301, the gate pin of the main switching transistor 310 is connected with the control pin of the constant current control chip 301, but in the implementation mode of FIG. 6, the main switching transistor 310 is installed outside the constant current control chip 301, the gate pin of the main switching transistor 310 is connected with the control pin of the constant current control chip 301, for the similarities to FIG. 4A, the descriptions thereof are omitted here. For such a circuit structure as shown in FIG. 6, the main switching transistor 310 is installed outside the constant current control chip 301, thereby the driving circuit with such a circuit structure may be applied to a high-power constant current control chip.

Although the above implementation mode is described with a BOOST topology as an example, a method of adjusting the output current of the driving circuit by adjusting the maximum on-time of the constant current control chip is not only applied to the BOOST topology, but also applied to topologies such as BUCK, BUCK-BOOST, Flyback, Forward and LLC. The adjusting method may be used by all LED driving IC with the maximum on-time pins.

According to another aspect of the present disclosure, an LED lamp is further provided, including an LED load and the above driving circuit, three-stage dimming control is performed on the LED load by the above driving circuit, thereby different brightness may be achieved by the LED lamp.

Although the above implementation modes of the present application adjust the resistance value of the variable control resistor in multi-resistor serially-connected and parallelly-connected combination modes respectively, the present application is not limited to the above embodiments, and the present application may also use the multi-resistor serially-connected and parallelly-connected combination modes to adjust the resistance value of the variable control resistor.

Apparently, the embodiments described above are only a part of the embodiments of the present disclosure, and are not all of the embodiments. Based on the embodiments in the present disclosure, all other embodiments obtained by those of ordinary skill in the art without creative work shall fall within a scope of protection of the present disclosure.

It is to be noted that terms used here are only for describing the specific implementation modes, and are not intended to limit the exemplary implementation modes according to the present application. As used herein, unless otherwise specified in the context, a singular form is also intended to include a plural form. In addition, it should also be understood that while terms "comprising" and/or "including" are used in the description, it indicates that there is a feature, a process, a work, a device, a component and/or combinations thereof.

It is to be noted that terms "first", "second" and the like in the description and claims of the present application and the above drawings are used to distinguish similar objects, and are not necessarily used to describe a specific sequence or precedence order. It should be understood that data used in this way may be interchanged in the suitable case, so that the implementation modes of the present application described here may be implemented in a sequence other than those illustrated or described here.

The above are only the preferred embodiments of the present disclosure, and are not used to limit the present disclosure, various modifications and changes may be made to the present disclosure by those skilled in the art. Any modifications, equivalent replacements, improvements and the like made within spirit and principle of the present disclosure shall be included in the scope of protection of the present disclosure.

What is claimed is:

1. A driving circuit for a Light Emitting Diode (LED) lamp, wherein the driving circuit is configured to perform three-stage dimming control on the LED lamp, and the three-stage dimming control is used for controlling the driving circuit to respectively provide three different levels of currents to an LED load of the LED lamp, wherein the driving circuit comprises:

three alternating voltage input terminals, wherein the three alternating voltage input terminals comprise two alternating voltage input terminals for receiving an alternating voltage and one common terminal, the two alternating voltage input terminals are controlled so that at least one alternating voltage input terminal receives the alternating voltage from a power supply;

a constant current control circuit, configured to receive the alternating voltage through at least one alternating voltage input terminal and outputting a constant direct current to an LED load, wherein, the constant current control circuit comprises a constant current control chip, and the constant current control chip at least comprises a maximum on-time pin; and a three-stage dimming detection control circuit, wherein the three-stage dimming detection control circuit comprises a variable control resistor for three-stage dimming control, the three-stage dimming detection control circuit is controlled by the alternating voltage received by at least one alternating voltage input terminal so that the variable control resistor with different resistance values is connected to the maximum on-time pin, and the constant current control chip is controlled according to a resistance value of the variable control resistor connected to the maximum on-time pin so that the constant current control circuit outputs three different levels of the currents.

2. The driving circuit of claim 1, wherein the two alternating voltage input terminals comprise a first alternating voltage input terminal and a second alternating voltage input terminal, and the three-stage dimming detection control circuit further comprises:

a first voltage division circuit, wherein an input end of the first voltage division circuit is connected to the first alternating voltage input terminal;

a second voltage division circuit, wherein an input end of the second voltage division circuit is connected to the second alternating voltage input terminal;

a first switching transistor, wherein a control end of the first switching transistor is connected to an output end of the first voltage division circuit; and a second switching transistor, wherein a control end of the second switching transistor is connected to an output end of the second voltage division circuit;

wherein, the first switching transistor is turned on while the first alternating voltage input terminal receives the alternating voltage, thereby a first control resistor is connected between the maximum on-time pin and the ground of the constant current control chip, the second switching transistor is turned on while the second alternating voltage input terminal receives the alternating voltage, thereby a second control resistor is connected between the maximum on-time pin and the ground of the constant current control chip, the first switching transistor and the second switching transistor are turned on while the first alternating voltage input terminal and the second alternating voltage input terminal both receive the alternating voltage, thereby a third control resistor is connected between the maximum on-time pin and the ground of the constant current control chip, wherein resistance values of the first control resistor, the second control resistor and the third control resistor are different.

3. The driving circuit of claim 2, wherein the variable control resistor comprises:

a first resistor, wherein one end of the first resistor is connected to the maximum on-time pin, and the other end of the first resistor is connected to a first connection end of the first switching transistor, a second connection end of the first switching transistor is grounded; and a second resistor, wherein one end of the second resistor is connected to the maximum on-time pin, and the other end of the second resistor is connected to a first connection end of the second switching transistor, a second connection end of the second switching transistor is grounded.

4. The driving circuit of claim 3, wherein the variable control resistor further comprises:

a third resistor, wherein one end of the third resistor is connected to the maximum on-time pin, and the other end of the third resistor is grounded.

5. The driving circuit of claim 3, wherein a resistance value of the first control resistor is equal to a resistance value of the first resistor, a resistance value of the second control resistor is equal to a resistance value of the second resistor, and a resistance value of the third control resistor is equal to a resistance value obtained by parallel connection of the first resistor and the second resistor.

6. The driving circuit of claim 4, wherein the resistance value of the first control resistor is equal to a resistance value obtained by parallel connection of the first resistor and the third resistor, the resistance value of the second control resistor is equal to a resistance value obtained by parallel connection of the second resistor and the third resistor, and the resistance value of the third control resistor is equal to a resistance value obtained by parallel connection of the first resistor, the second resistor and the third resistor.

7. The driving circuit of claim 2, wherein the variable control resistor comprises:

a first resistor, wherein one end of the first resistor is grounded, and the other end of the first resistor is connected to a first connection end of the second switching transistor, wherein a second connection end of the second switching transistor is grounded;

a second resistor, wherein one end of the second resistor is connected to the other end of the first resistor; and a third resistor, wherein one end of the third resistor is connected to the maximum on-time pin, the other end of the third resistor is connected to a first connection end of the first switching transistor and the other end of the second resistor, and a second connection end of the first switching transistor is connected to the other end of the first resistor.

8. The driving circuit of claim 7, wherein the resistance value of the first control resistor is equal to a resistance value obtained by serial connection of the first resistor and the third resistor, the resistance value of the second control resistor is equal to a resistance value obtained by serial connection of the second resistor and the third resistor, and the resistance value of the third control resistor is equal to the resistance value of the third resistor.

9. The driving circuit of claim 2, wherein the first voltage division circuit comprises a first capacitor, a fourth resistor and a fifth resistor which are used for voltage division.

10. The driving circuit of claim 9, wherein the first capacitor is connected between an output end of the first voltage division circuit and the ground, the fourth resistor is connected between the output end of the first voltage division circuit and the ground, one end of the fifth resistor is connected to the first alternating voltage input terminal, and the other end of the fifth resistor is connected to the output end of the first voltage division circuit.

11. The driving circuit of claim 2, wherein the second voltage division circuit comprises a second capacitor, a sixth resistor and a seventh resistor which are used for voltage division.

12. The driving circuit of claim 11, wherein the second capacitor is connected between an output end of the second voltage division circuit and the ground, the sixth resistor is connected between the output end of the second voltage division circuit and the ground, one end of the seventh resistor is connected to the second alternating voltage input terminal, and the other end of the seventh resistor is connected to the output end of the second voltage division circuit.

13. The driving circuit of claim 1, wherein the constant current control circuit comprises a main switching transistor, the main switching transistor is installed inside the constant current control chip, in the interior of the constant current control chip, a gate pin of the main switching transistor is connected with a control pin of the constant current control chip, or the constant current control circuit comprises a main switching transistor, the main switching transistor is installed outside the constant current control chip, and a gate pin of the main switching transistor is connected with a control pin of the constant current control chip.

14. The driving circuit of claim 1, wherein the constant current control circuit comprises: a rectifying and filtering circuit, wherein the rectifying and filtering circuit receives the alternating voltage through the at least one alternating voltage input terminal and performs rectification filtering processing on the alternating voltage so as to output a direct voltage; and a DC-DC constant current circuit, comprising the constant current control chip, and receiving the direct voltage from the rectifying and filtering circuit and converting the direct voltage into a constant current so as to output to the LED load.

15. The driving circuit of claim 9, wherein the first voltage division circuit further comprises a first Zener Diode 2, the first zener diode 2 is connected between the output end of the first voltage division circuit and the ground.

16. The driving circuit of claim 11, wherein the second voltage division circuit further comprises a second Zener Diode 1, the second zener diode 1 is connected between the output end of the second voltage division circuit and the ground.

17. A Light Emitting Diode (LED) lamp, wherein the LED lamp comprises an LED load and the driving circuit of claim 1, the driving circuit is configured to drive the LED load.

18. A method for operating a driving circuit for a Light Emitting Diode (LED) lamp, wherein the driving circuit is configured to perform three-stage dimming control on the LED lamp, and the three-stage dimming control is used for controlling the driving circuit to respectively provide three different levels of currents to an LED load of the LED lamp, wherein the method comprises:
receiving, by at least one of two alternating voltage input terminals of the driving circuit, an alternating voltage from a power supply;
supplying, by the at least one of two alternating voltage input terminals, the alternating voltage to a constant current control circuit and a three-stage dimming detection control circuit of the driving circuit;
controlling the three-stage dimming detection control circuit by means of the alternating voltage so that a variable control resistor with different resistance values in the three-stage dimming detection control circuit is connected to the maximum on-time pin of a constant current control chip in the constant current control circuit;
performing, by the constant current control chip, control according to a resistance value of the variable control resistor connected to the maximum on-time pin so that the constant current control circuit outputs three different levels of the currents.

19. The method of claim 18, wherein the two alternating voltage input terminals comprise a first alternating voltage input terminal and a second alternating voltage input terminal, and the three-stage dimming detection control circuit further comprises:
a first voltage division circuit, wherein an input end of the first voltage division circuit is connected to the first alternating voltage input terminal;
a second voltage division circuit, wherein an input end of the second voltage division circuit is connected to the second alternating voltage input terminal;
a first switching transistor, wherein a control end of the first switching transistor is connected to an output end of the first voltage division circuit; and
a second switching transistor, wherein a control end of the second switching transistor is connected to an output end of the second voltage division circuit, wherein
the method comprises:
receiving, by the first alternating voltage input terminal, the alternating voltage, thereby turning on the first switching transistor and connecting a first control resistor between the maximum on-time pin and a ground of the constant current control chip, or
receiving, by the second alternating voltage input terminal, the alternating voltage, thereby turning on the second switching transistor and connecting a second control resistor between the maximum on-time pin and the ground of the constant current control chip, or
receiving, by the first alternating voltage input terminal and the second alternating voltage input terminal, the alternating voltage, thereby turning on both the first switching transistor and the second switching transistor and connecting a third control resistor between the maximum on-time pin and the ground of the constant current control chip, wherein resistance values of the first control resistor, the second control resistor and the third control resistor are different.

20. The method of claim 18, wherein the variable control resistor comprises at least two resistors having different resistance, and the method comprises individually connecting one of the at least two resistors to the maximum on-time pin or connecting two of the at least two resistors to the maximum on-time pin in parallel or in series to implement the different resistance values.

* * * * *